2 Sheets—Sheet 1.

C. L. DEXTER.

ICE CREAM FREEZER.

No. 10,038. Reissued Feb. 21, 1882.

WITNESSES
P. L. Dietrich
Fred. G. Dieterich

INVENTOR
Chas. L. Dexter
per
L. Lloyd Wiegand Attorney.

2 Sheets—Sheet 2.

C. L. DEXTER.

ICE CREAM FREEZER.

No. 10,038. Reissued Feb. 21, 1882.

WITNESSES
P. C. Dieterich.
Fred. L. Dieterich.

INVENTOR
Chas. L. Dexter.
per. Lloyd Wiegand Attorney

UNITED STATES PATENT OFFICE.

CHARLES L. DEXTER, OF PHILADELPHIA, PENNSYLVANIA.

ICE-CREAM FREEZER

SPECIFICATION forming part of Reissued Letters Patent No. 10,038, dated February 21, 1882.

Original No. 181,055, dated August 15, 1876. Application for reissue filed January 6, 1882.

*To all whom it may concern:*

Be it known that I, CHARLES LINUS DEXTER, of Philadelphia, in the county of Philadelphia and State of Pennsylvania, have invented a new and useful Improvement in Ice-Cream Machines, of which the following is a specification.

Figure 1:
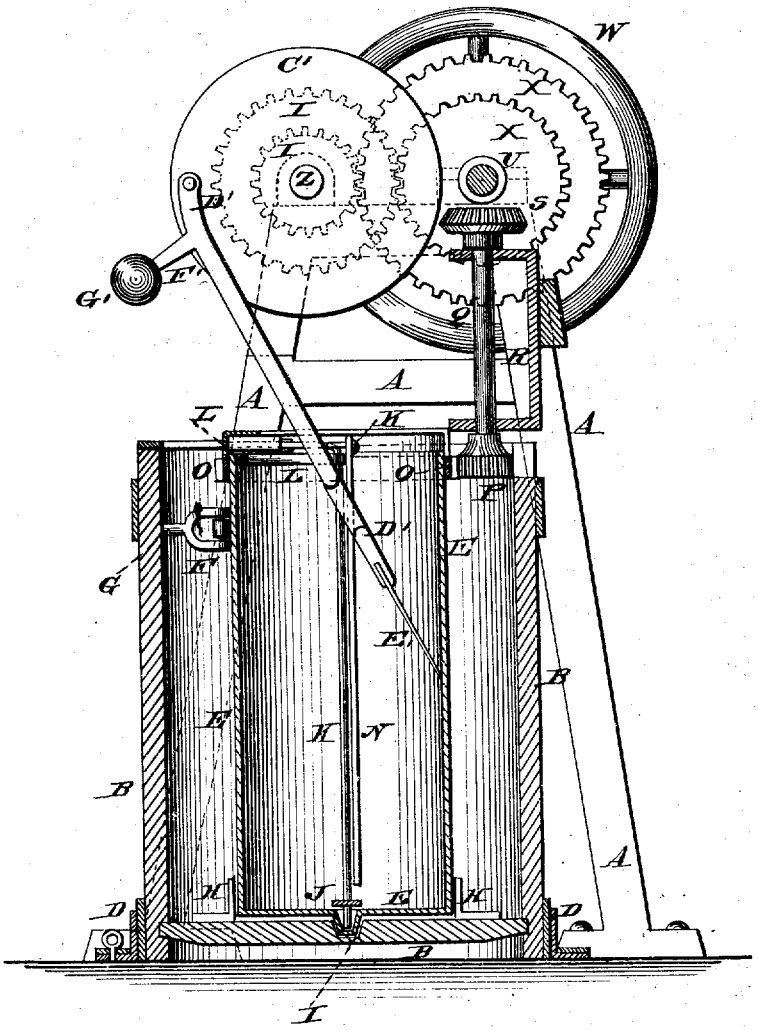
Figure 2:
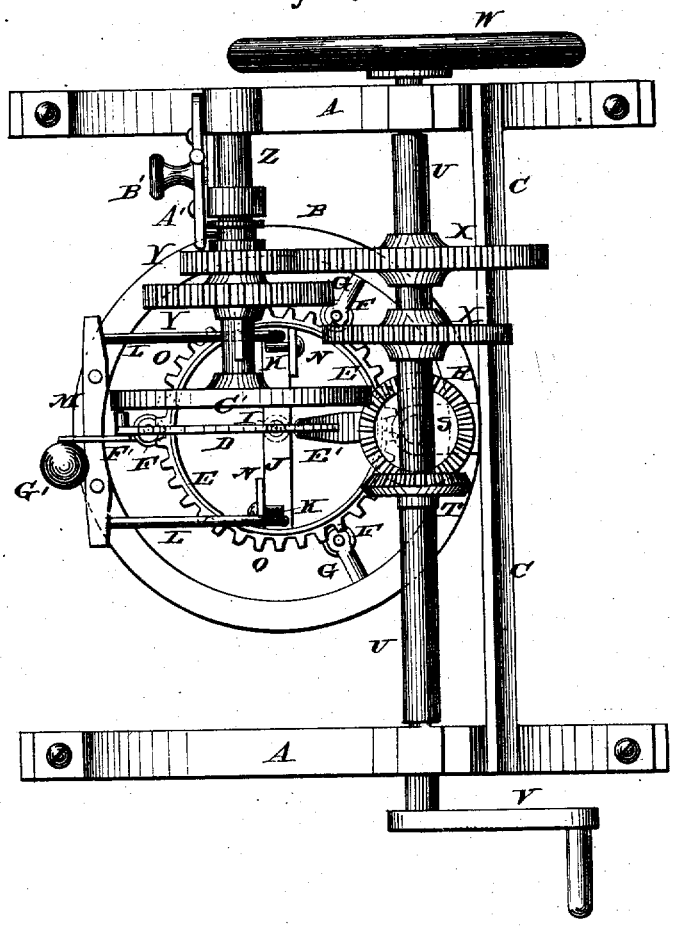

Figure 1 is a vertical section of my improved machine. Fig. 2 is a top view of the same.

Similar letters of reference indicate corresponding parts.

The object of this invention is to produce ice-cream similar to that produced by the usual process of hand-labor by a paddle, and to this end a paddle or scraper is employed operated by machinery, to the action of which paddle the can is presented and turned automatically by machinery.

This invention may be briefly stated to consist of a progressively-revolving can subjected to refrigerating action and a vertical or obliquely reciprocating stirrer or paddle combined therewith, together with a mechanism to operate the same in a manner resembling the paddling of cream by hand, constructed as hereinafter more fully described, and particularly stated in the claims.

A are the side frames of the machine, the lower ends of which are bolted to the floor or to a platform, and are placed at such a distance apart as to receive the tub B between them, and which are connected at the rear side of their upper parts by a cross-bar, C. The tub B is kept in place by brackets or angle-irons D, one or all of which are made detachable, so that the tub may be readily removed when desired.

E is the can, which is made smaller than the tub B, is placed in the said tub, and is kept concentric therewith by the friction-rollers F, which rest against its upper part and are pivoted to arms G, attached to the tub B by the angle-irons H, attached to the bottom of the tub B, and by the pivot I, formed upon its bottom, and which passes into a socket in the bottom of the tub B. The pivot I is made hollow to receive a pin attached to the center of a cross-bar, J, which crosses the bottom of the can E, and the ends of which are attached to the lower ends of the rods K. The rods K pass up along the sides of the can E, and their upper ends are attached to the ends of the arms L, which pass out at the top of the can E, and are attached to the ends of a cross-bar, M, secured to the upper edge of the tub.

To the upper ends of the rods K are pivoted the upper end of the floats or bars N, which hang down along the side of the can E, and are designed to scrape the cream as it freezes on the can.

To the outer side of the upper end of the can E is attached a gear-wheel, O, into the teeth of which mesh the teeth of the gear-wheel P, attached to the lower end of the shaft Q, and by which the said can E is revolved. The shaft Q revolves in a bracket, R, attached to the cross-bar C of the frame A, and to its upper end is attached a bevel-gear wheel, S, the teeth of which mesh into the teeth of the bevel-gear wheel T, attached to the shaft U, which revolves in bearings attached to the tops of the frames B.

To one end of the shaft U is attached a crank, V, by means of which motion is given to the machine, and to its other end is attached a fly-wheel, W, to give steadiness to the motion.

To the shaft U are attached two gear-wheels, X, of different sizes.

Y are two gear-wheels, of different sizes, attached to a hub placed upon a short shaft, Z, and connected with it by a tongue and groove, so that the gear-wheels Y may be adjusted to cause the larger gear-wheel Y to mesh into the smaller gear-wheel X, or the smaller gear-wheel Y into the larger gear-wheel X, according as a slower or faster motion is required. The gear-wheels Y are adjusted upon the shaft Z by a slide, A′, which is slotted longitudinally to receive the clamping-screw B′, by which the gear-wheels Y are secured in place when adjusted. The shaft Z revolves in bearings in the frame A and in a bracket attached to said frame, and to its inner end, directly over the can E, is attached a crank-wheel, C′, to the crank-pin of which is pivoted the upper end of the bar D′.

To the lower end of the bar D′ is attached a paddle, E′, and to it, near its upper end, is attached an arm, F′, projecting at right angles, and having a weight, G′, formed upon or attached to its outer end. By this construction, as the wheel C′ is revolved, the paddle E′ will be moved up and down through the can E, the weighted arm F′ G′ causing it to move down along the inner surface of the can E to keep the cream from freezing to said surface. The motion of the upper end of the bar D′ participates in the circular motion of the crank-pin in the crank-wheel C′, while the lower end of the rod D′, bearing the paddle or scraper E′, moves in a vertical direction, being guided to the inner side of the can E, so that the motion of the paddle E′, while being vertical and in scraping contact with the inner side of the can at the lower end, vibrates and stirs the freezing cream and opens it so as to admit air, and stirs and tempers it, producing in the frozen product the desirable degree of smoothness and lightness heretofore produced by paddling the cream by hand.

I am aware that ice-cream-making machines have been used wherein the cream contained in a revolving vessel was scraped from the sides and stirred by a paddle operated by hand; also, that revolving ice-cream freezers have been used containing blades jointed to a support or fulcrum within the can and reciprocated by mechanism operated by the same power that rotated the can. The first of these is objectionable, as requiring manual labor and judgment or skill on the part of the operator, and the latter for having articulated parts or joints in contact with the cream, and also as incapable of effectively paddling and scraping the entire depth of the can; and neither of these do I claim; but What I do claim is—

1. In a machine for making ice-cream, the combination of a revolving can with a vertically and obliquely reciprocating scraper or paddle, so connected and operated by intermediate mechanism with the driving-shaft as to scrape the side of the can throughout its descending stroke, substantially as and for the purpose set forth.

2. In a machine for making ice-cream, the combination of a progressively-revolving can with a vertically-reciprocating scraper or paddle rigidly attached to a bar connected at its upper end to a revolving crank, and pressed obliquely against the side of the can during its descending stroke, substantially as and for the purpose set forth.

3. In a machine for making ice-cream, the combination of a progressively-rotating can and a vertically and obliquely reciprocating scraper with propelling-gearing adapted to operate the can and scraper at different relative velocities, substantially as and for the purpose set forth.

4. The combination, in an ice-cream freezer, of the outer tub, B, having arms G, friction-rollers F, and angle-irons H, with the inner revolving can, E, and operating-gearing, substantially as herein described, for the purpose set forth.

5. The combination of the cross-bar J, the rods K, the arms L, the cross-bar M, and the floats N with the can E and tub B, substantially as herein shown and described.

6. The combination of the gear-wheels X X, the sliding gear-wheels Y Y, the crank-wheel C′, and the pivoted bar D′, provided with a paddle, E′, and the weighted arm F′ G′, substantially as herein shown and described.

7. In a machine for making ice-cream, the combination of stationary scrapers or floats M with the rotating can and vertically-reciprocating paddle, arranged to operate substantially as and for the purpose set forth.

CHAS. L. DEXTER.

Witnesses:
LINN WHEELER,
J. DANIEL EBY.